(12) United States Patent
He et al.

(10) Patent No.: US 7,661,989 B1
(45) Date of Patent: Feb. 16, 2010

(54) MEMORY CARD CONNECTOR

(75) Inventors: Hang-Xiao He, Tu-Cheng (TW); Wei-Hong Liao, Tu-Cheng (TW); Ming-Chiang Chen, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/292,571

(22) Filed: Nov. 21, 2008

(51) Int. Cl.
*H01R 13/648* (2006.01)
(52) U.S. Cl. .................... 439/607.33; 439/630
(58) Field of Classification Search ............................... 439/607.31–607.33, 607.22, 630
See application file for complete search history.

(56) References Cited

U.S. PATENT DOCUMENTS

| | | | |
|---|---|---|---|
| 6,872,095 B2* | 3/2005 | Sato et al. ................ | 439/630 |
| 6,976,860 B1* | 12/2005 | Su ........................... | 439/159 |
| 2006/0148322 A1* | 7/2006 | Matsukawa et al. ...... | 439/630 |
| 2007/0111603 A1* | 5/2007 | Wang ....................... | 439/630 |

* cited by examiner

*Primary Examiner*—Gary F. Paumen
(74) *Attorney, Agent, or Firm*—Rosenberg, Klein & Lee (57) ABSTRACT

A memory card connector adapted for receiving a memory card includes an insulating housing, a plurality of terminals, a first shielding shell and a second shielding shell. The insulating housing has a bottom wall, a rear wall, two opposite first and second sidewalls, all of which together define a receiving space therebetween for receiving the memory card. Two resisting portions are respectively positioned at two opposite sides of the receiving space adjacent to the first and second sidewalls and spaced from the bottom wall for respectively pressing against two opposite sides of the memory card. Each of the terminals has a contact portion projecting into the receiving space for being electrically connected with the memory card. The first shielding shell is mounted to the first sidewall and the second shielding shell is mounted to the second sidewall to be spaced away from the first shielding shell.

9 Claims, 7 Drawing Sheets

MEMORY CARD CONNECTOR

BACKGROUND OF THE INVENTION

1. Field of the Invention

The present invention relates to a connector, and more particularly to a memory card connector.

2. The Related Art

Card connectors are widely used in various electronic products for receiving electronic cards which are capable of storing up data information. A conventional memory card connector adapted for receiving a memory card includes an insulating housing, a plurality of terminals received in the insulating housing, an ejector, and a shielding shell encircling the insulating housing. The shielding shell has a top plate covering on the insulating housing to form a receiving space for accommodating the memory card. The ejector is received one side of the receiving space for ejecting the memory card out from the insulating housing.

With the miniaturization trend of the electronic products, the card connectors should be designed smaller to be correspondingly assembled to the electronic products. The conventional memory card connector described above employs the shielding shell to encircle the insulating housing to form the receiving space for receiving and fixing the memory card in the memory card connector, which increases the height of the memory card connector and makes the memory card connector take up more space when assembled in the electronic product.

SUMMARY OF THE INVENTION

An object of the present invention is to provide a memory card connector having reduced total height. The memory card connector includes an insulating housing, a plurality of terminals received in the insulating housing, a first shielding shell and a second shielding shell. The insulating housing has a bottom wall, a rear wall, two opposite first and second sidewalls respectively extending upwardly form the bottom wall, all of which together define a receiving space therebetween for receiving a memory card. Two resisting portions are respectively positioned at two opposite sides of the receiving space adjacent to the first and second sidewalls and spaced from the bottom wall for respectively pressing against two opposite sides of the memory card. Each of the terminals has a contact portion projecting into the receiving space for being electrically connected with the memory card. The first shielding shell is mounted to the first sidewall and the second shielding shell is mounted to the second sidewall to be spaced away from the first shielding shell.

As described above, by the two resisting portions respectively positioned at the two opposite sides of the receiving space adjacent to the first and second sidewalls and spaced from the bottom wall to press against the two opposite sides of the memory card, the memory card is received in the memory card connector firmly. The memory card connector of the present invention does not use a shielding shell to wholly encircle the insulating housing for fixing the memory card, which decreases the total height of the memory card connector of the present invention.

BRIEF DESCRIPTION OF THE DRAWINGS

The present invention will be apparent to those skilled in the art by reading the following description of embodiments thereof, with reference to the attached drawings, in which.

DETAILED DESCRIPTION OF THE PREFERRED EMBODIMENT

Figure 1:
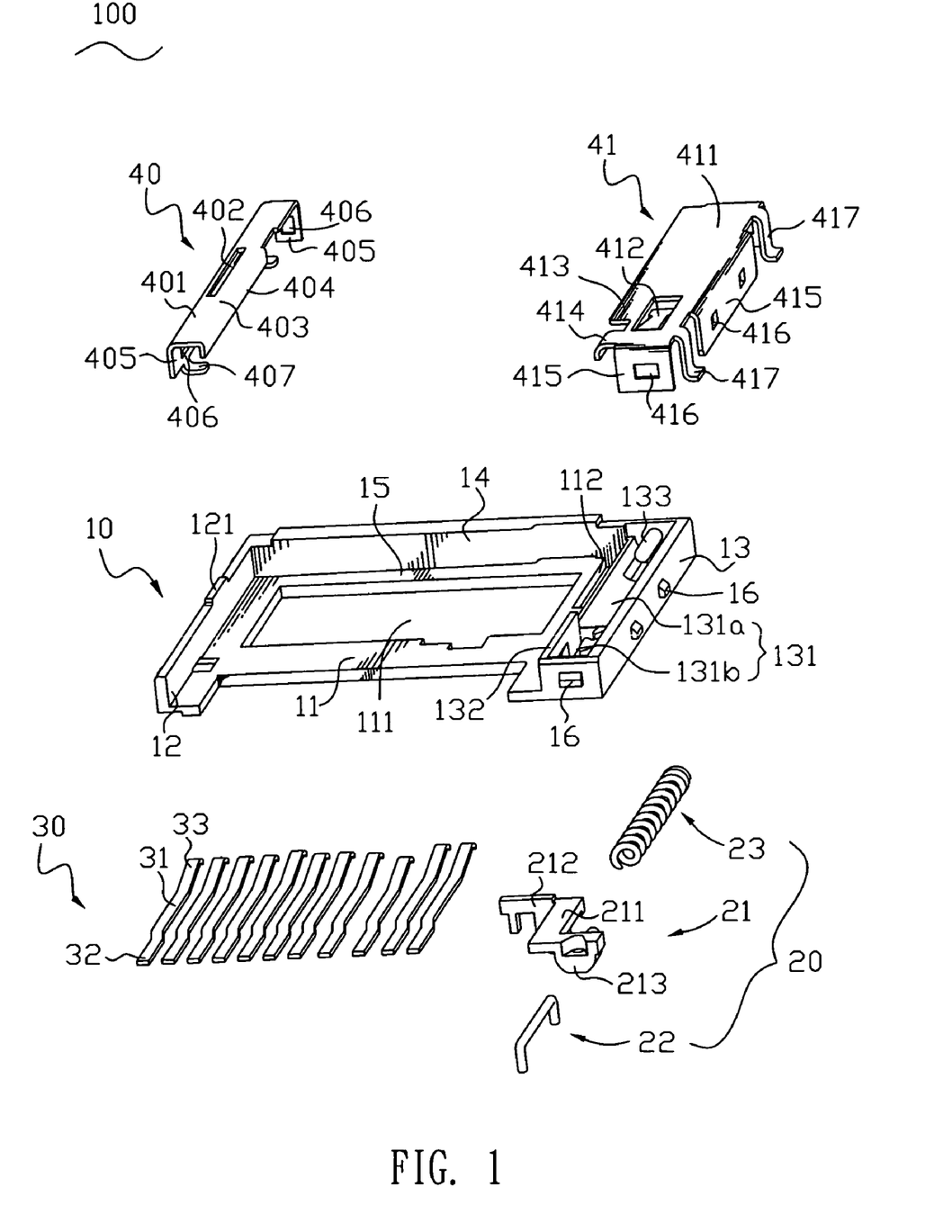
FIG. 1 is an exploded view of a memory card connector of a first embodiment in accordance with the present invention.

With reference to FIG. 1, which shows a first embodiment of a memory card connector 100 in accordance with the present invention. The memory card connector 100 includes an insulating housing 10, an ejector mechanism 20, a plurality of terminals 30, a first shielding shell 40 and a second shielding shell 41.

Figure 2:
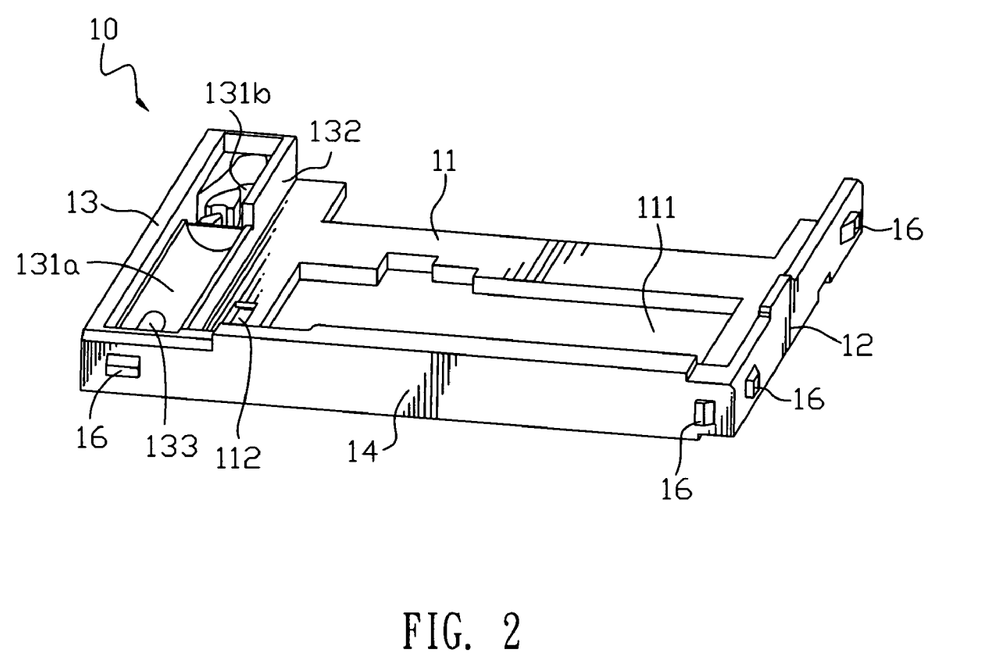
FIG. 2 is a perspective view showing an insulating housing of the memory card connector.
Figure 5:
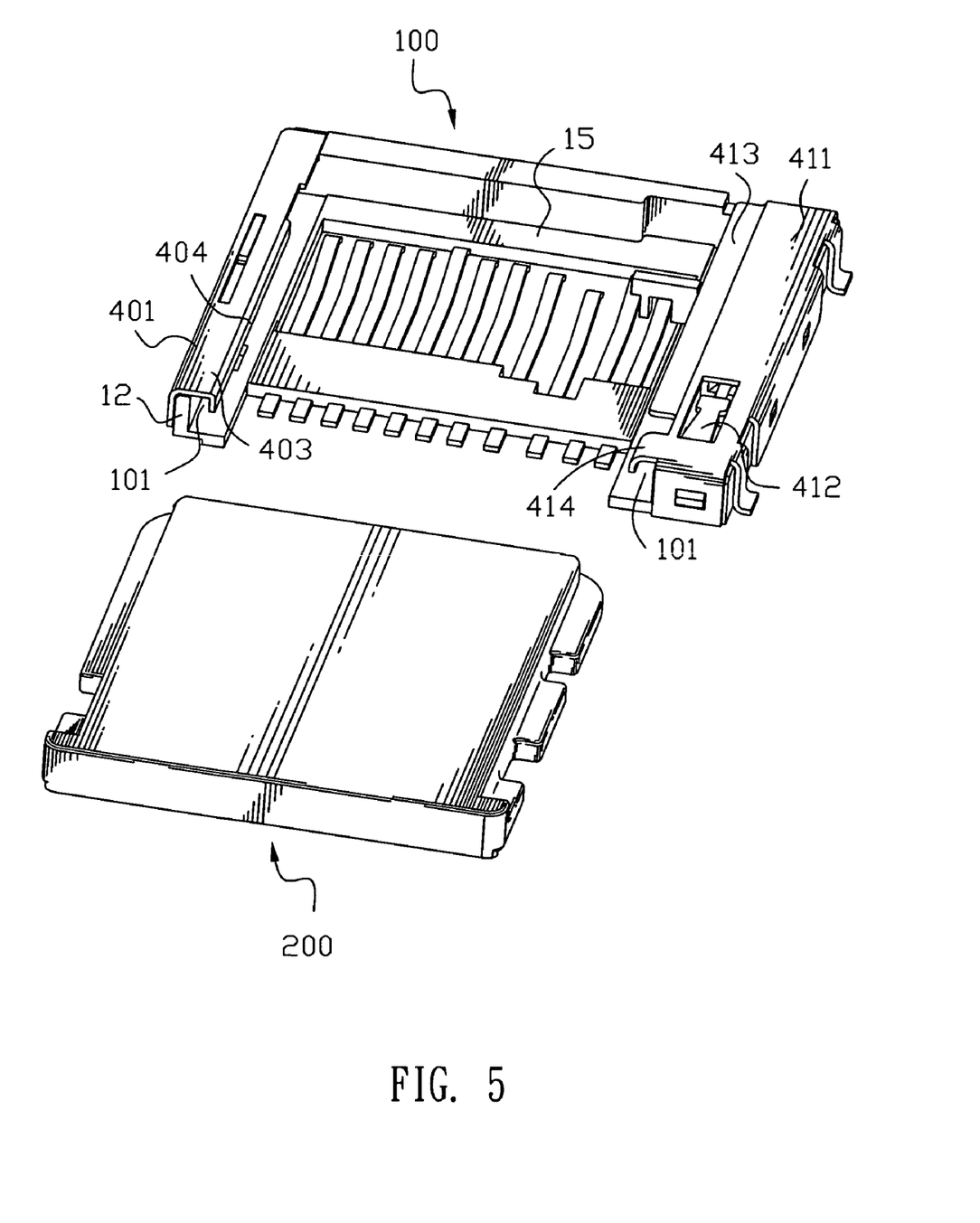
FIG. 5 shows a perspective view of the memory card connector of FIG. 1 and a memory card before inserted into the memory card connector.

Please refer to FIGS. 1 and 2, the insulating housing 10 has a bottom wall 11, two opposite first and second sidewalls 12, 13 and a rear wall 14, all of which together define a receiving space 15 therebetween in combination for receiving a memory card 200 (shown in FIG. 5). The bottom wall 11 defines a containing trough 111 penetrating therethrough for accommodating the terminals 30. A sliding slot 112 is defined between the containing trough 111 and the second sidewall 13 and longitudinally penetrates through a rear of the bottom wall 11. Both of the first sidewall 12, the second sidewall 13 and the rear wall 14 define two substantially wedge-shaped lumps 16 projecting outside. The first sidewall 12 further defines a projection 121 projecting upwardly from a top side thereof.

The second sidewall 13 defines a sliding groove 131 for receiving the ejector mechanism 20 therein. A rear portion of the sliding groove 131 communicated with the receiving space 15 is defined as a receiving recess 131a which has an arc-shaped bottom. A front portion of the sliding groove 131 separated from the receiving space 15 by a partition 132 is defined as a substantially heart-shaped guiding slot 131b adjacent to the receiving recess 131a. The heart-shaped guiding slot 131b has a concave (not labeled) facing to the receiving recess 131a. A holding pillar 133 projects forward from a rear wall of the sliding groove 131 and is located in the receiving recess 131a. A front wall of the sliding groove 131 defines a substantially wedge-shaped lump 16 protruding outside.

Figure 3:
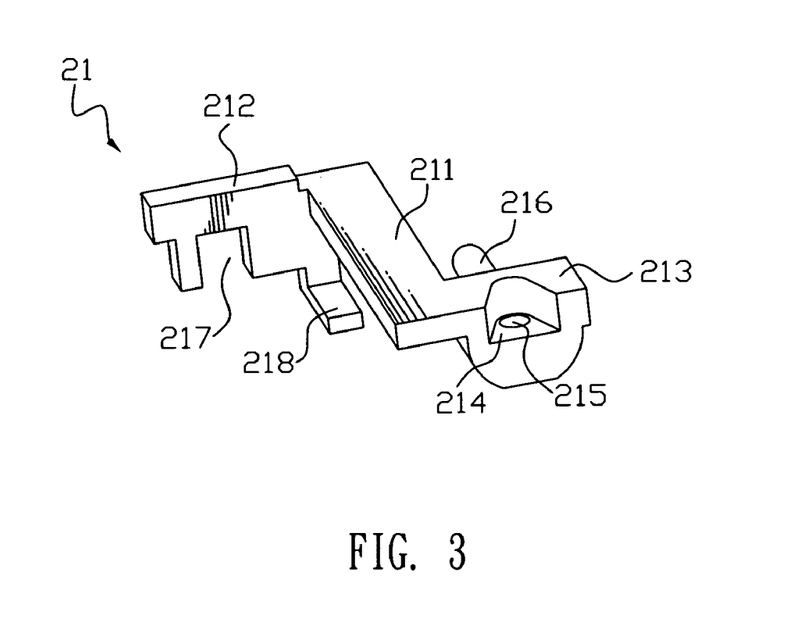
FIG. 3 is a perspective view of a sliding element of the memory card connector.
Figure 4:
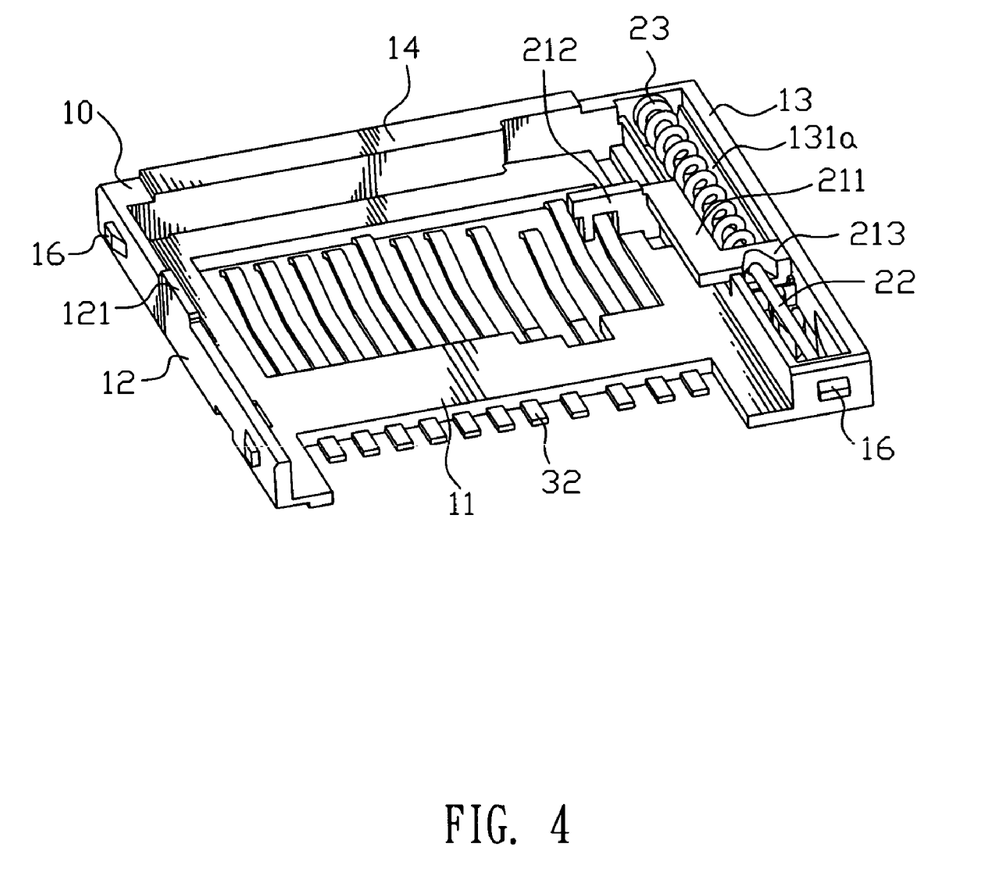
FIG. 4 is an assembly view showing an ejector mechanism assembled to the insulating housing of FIG. 2.

Please refer to FIGS. 1 and 3, the ejector mechanism 20 includes a sliding element 21, a guide pin 22 and an elastic element 23. The sliding element 21 has a base portion 211. Two ends of the base portion 211 respectively extend in opposite directions to form a sliding portion 212 and a pushing portion 213. The pushing portion 213 defines a holding cavity 214 located at a front portion thereof and an insertion hole 215 penetrating through a bottom side of the holding cavity 214. A location pillar 216 protrudes rearward from a rear portion of the pushing portion 213. The sliding portion 212 defines an opening 217 at a lower portion thereof and away from the base portion 211. A sliding arm 218 extends forward from a bottom end of the sliding portion 212 and is substantially parallel to the base portion 211. As best shown in FIG. 4, in assembly of the ejector mechanism 20, the pushing portion 213 of the sliding element 21 is located in a front end of the receiving recess 131a. The base portion 211 is crossed above one side of the receiving recess 131a. The sliding portion 212 is placed on the bottom wall 111 with the opening 217 communicated with the containing trough 111 and the sliding arm 218 slidably received in the sliding slot 113. The elastic element 23 is received in the receiving recess 131a with one end encircling the holding pillar 133 and against the rear wall of the sliding groove 131, while the other end encircling the location pillar 216 and against the pushing portion 213. One end of the guide pin 22 is inserted into the insertion hole 215 and the other end is slidably received in the heart-shaped guiding slot 131b.

Each of the terminals 30 has a fixed portion 31, a soldered portion 32 and a contact portion 33. The terminals 30 are integrally formed to the insulating housing 10 with the fixed portions 31 inlaid to the bottom wall 11, the soldered portions 32 exposed out of the bottom wall 11 for being soldered to a PCB, and the contact portions 33 received in the containing trough 111 for electrically connecting with the memory card 200. The contact portion 33 of one of the terminals 30 further passes through the opening 217 of the sliding portion 212.

Refer to FIG. 1 and FIG. 5, the first shielding shell 40 mounted to the first sidewall 12 of the insulating housing 10, has a first top plate 401 covered on a top of the first sidewall 12. The first top plate 401 defines a through-slot 402 for receiving the projection 121. A first extending plate 403 extends sideward from one side of the first top plate 401 to define a sliding passage 101 between the first extending plate 403 and the bottom wall 11. A free edge of the first extending plate 403 extends towards the bottom wall 11 to form a first resisting portion 404 positioned at one side of the receiving space 15 adjacent to the first sidewall 12 and spaced from the bottom wall 11. Two adjoining sides of the first top plate 401 extend downwardly to form two first side plates 405 respectively attached to the outside of the first sidewall 12 and the rear wall 14. The first side plates 405 define plural first fixing holes 406 for being engaged with the corresponding wedge-shaped lumps 16. A pair of first grounding pieces 407 extends sideward from a bottom end of the first side plate 405 which is attached to the first sidewall 12 for propping against the bottom wall 11.

The second shielding shell 41 is assembled to the second sidewall 13 of the insulating housing 10 to be spaced away from the first shielding shell 12. The second shielding shell 41 defines a second top plate 411 mounted on a top of the second sidewall 13 and covered on the ejector mechanism 20. The second top plate 411 punching-cuts an elastic plate 412 at a front portion thereof pressing against the guide pin 22 for avoiding the guide pin 22 releasing out of the heart-shaped guiding slot 131b. A second extending plate 413 extends horizontally from one edge of the second top plate 411 and covers on the base portion 211 of the sliding element 21 to define another sliding passage 101 between the second extending plate 413 and the bottom wall 11. Adjacent to the second extending plate 413, a second resisting portion 414 extends horizontally and then bends downwardly from a front of the second top plate 411 to be positioned at the other side of the receiving space 15 adjacent to the second sidewall 13 and spaced from the bottom wall 11. The other edges of the second top plate 411 extend downwardly to form second side plates 415 attached to the outside of the second sidewall 13. The second side plates 415 define plural second fixing holes 416 for being engaged with the corresponding wedge-shaped lumps 16. The second shielding shell 41 further defines a pair of second grounding pieces 417 extending downward from the second top plate 411 and attached to the outside of the second sidewall 13.

Figure 6:
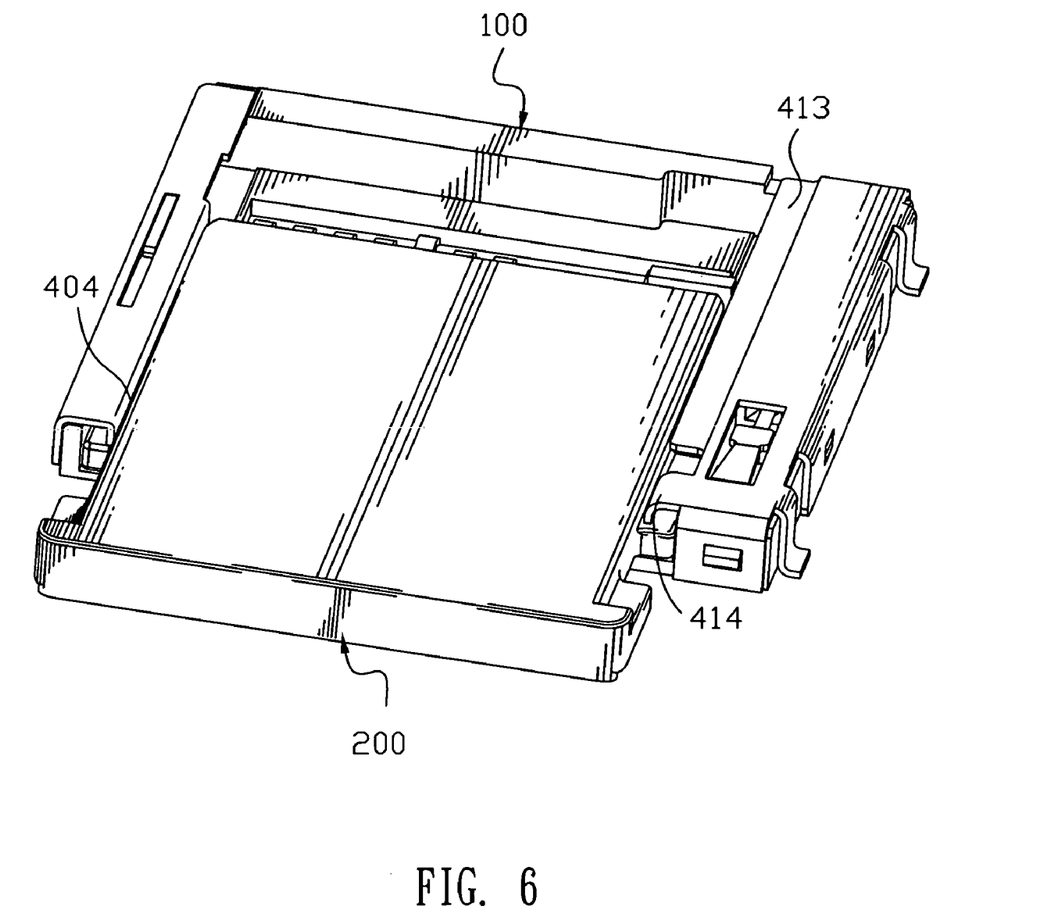
FIG. 6 is an assembly view showing the memory card which has been inserted into the memory card connector of FIG. 5.

Refer to FIGS. 4-6, the memory card 200 is inserted into the memory card connector 100 via sliding in the sliding passages 101 to enter the receiving space 15. The memory card 200 pushes the sliding portion 212 to make the sliding arm 218 slide rearward along the sliding slot 112. Then the pushing portion 213 is driven to compress the elastic element 23 and pull the guide pin 22 to slide backwards along the heart-shaped guiding slot 131b. When the end of the guide pin 22 slides into the concave of the heart-shaped guiding slot 131b, the memory card 200 is fully received in the receiving space 15 of the memory card connector 100. In this case, the first resisting portion 404 and the second resisting portion 414 respectively tightly press against two opposite sides of the memory card 200 for fixing the memory card 200, thus the memory card 200 is received in the memory card connector 100 firmly. When the memory card 200 is to be ejected from the memory card connector 100, a user may push the memory card 200 again to make the guide pin 22 slip out of the concave of the heart-shaped guiding slot 131b. Then the elastic element 23 is released and pushes the pushing portion 213 to slide forwardly, meanwhile, the sliding portion 212 slides forward and ejects the memory card 200 out from the memory card connector 100. In this case, the guide pin 22 returns to original position of the heart-shaped guiding slot 131b.

Figure 7:
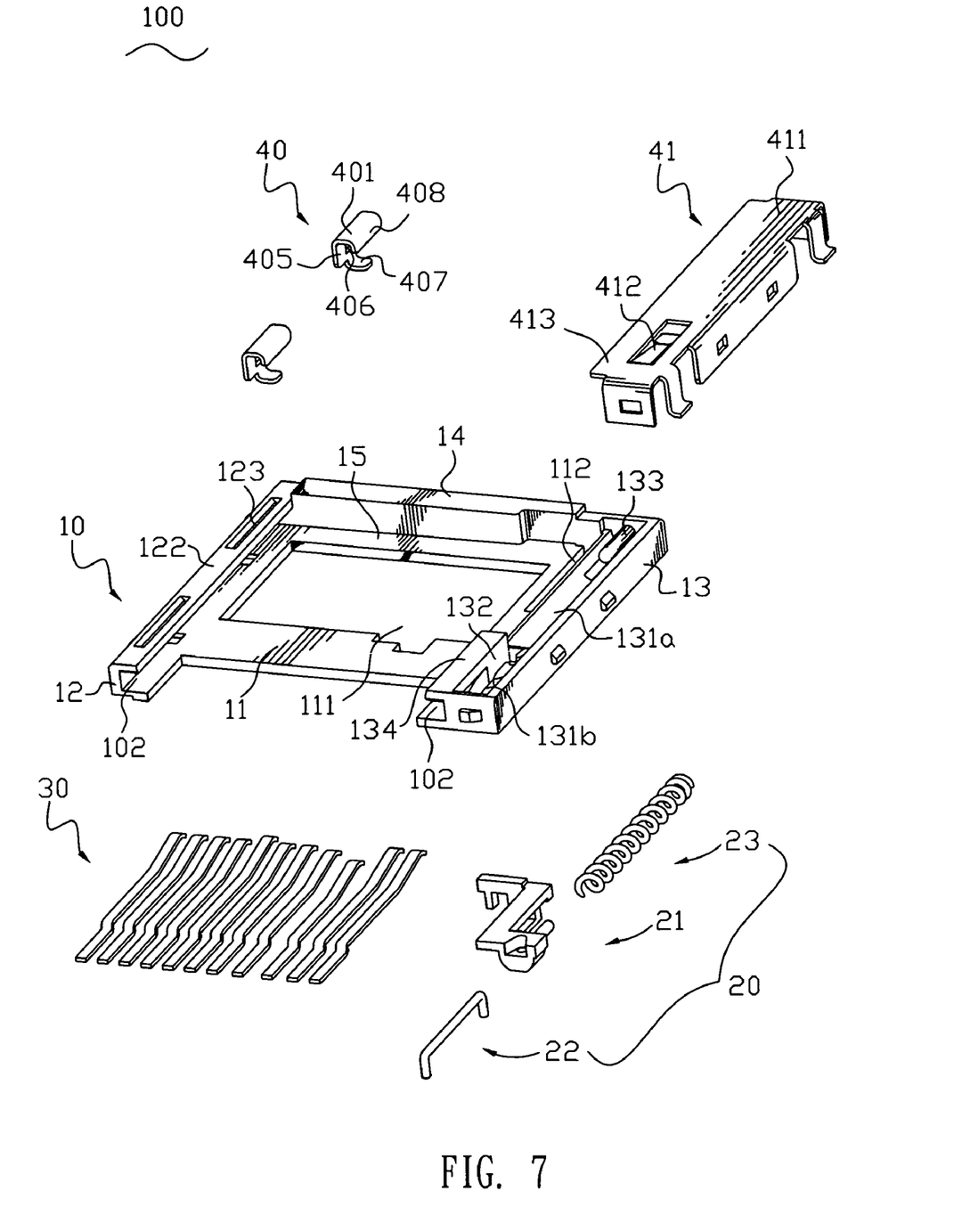
FIG. 7 is an exploded view of a memory card connector of a second embodiment in accordance with the present invention.

With reference to FIG. 7, which shows a second embodiment of the memory card connector 100 according to the present invention. The memory card connector 100 includes an insulating housing 10, an ejector mechanism 20, a plurality of terminals 30, a pair of first shielding shells 40 and a second shielding shell 41. In this embodiment, the ejector mechanism 20 and the terminals 30 are the same as that of the first embodiment and not described in detail herein.

In this embodiment, the insulating housing 10 is similar to the insulating housing 10 of the first embodiment, having a bottom wall 11, a first sidewall 12, a second sidewall 13, a rear wall 14 and a receiving space 15 formed therebetween. Tops of the first sidewall 12 and the partition 132 of the insulating housing 10 respectively horizontally extends towards each other to form a first resisting portion 122 and a second resisting portion 134 showing a board shape, and therefore, two sliding passages 102 are respectively formed between the first resisting portion 122 and the bottom wall 11, and the second resisting portion 134 and the bottom wall 11. The first resisting portion 122 defines two fixing slots 123 penetrating therethrough for correspondingly fixing the first shielding shells 40.

Each of the first shielding shells 40 has a first top plate 401 covered on the first resisting portion 122, a first side plate 405 attached to the outside of the first sidewall 12 and a grounding piece 407 attached to the bottom wall 11. The first side plate 405 also defines a fixing hole 406 for correspondingly engaging with a wedge-shaped lump 16 of the first sidewall 12. A free side of the first top plate 401 extends downward to form a fixed plate 408 buckled into the corresponding fixing slot 123 for fixing the first shell 40 to the first sidewall 12.

The second shielding shell 41 is similar to that of the first embodiment, the difference is that the second shielding shell 41 does not define a second resisting portion thereon, but a second extending plate 413 of the second shielding shell 41 terminates to a front end of a second top plate 411 of the second shielding shell 41.

Figure 8:
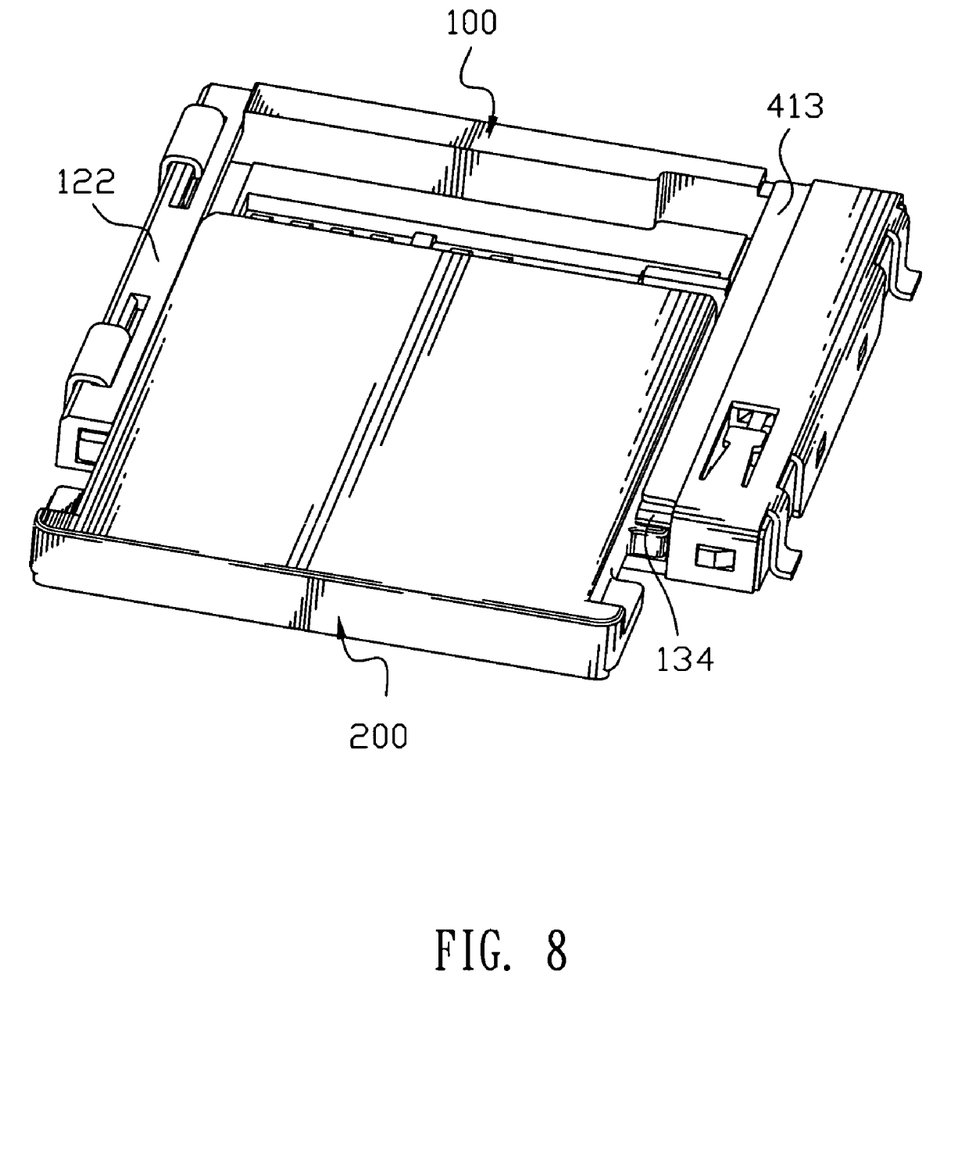
FIG. 8 is an assembly view showing the memory card which has been inserted into the memory card connector of FIG. 7.

Refer to FIG. 8, as the above-mentioned first embodiment, in this embodiment, the memory card 200 is inserted into the memory card connector 100 via sliding in the sliding passages 102 to enter the receiving space 15. When the memory card 200 is fully received in the receiving space 15 of the memory card connector 100, the first resisting portion 122 and the second resisting portion 134 are tightly against the two opposite sides of the memory card 200 for fixing the memory card 200 in the memory card connector 10 firmly.

As the above description, by the first resisting portion 404, 122 and the second resisting portion 414, 134 respectively positioned at the two opposite sides of the receiving space 15 adjacent to the first sidewall 12 and the second sidewall 13 and spaced from the bottom wall 11 to press against the two opposite sides of the memory card 200, the memory card 200 is received in the memory card connector 100 firmly. The memory card connector 100 of the present invention does not use a shielding shell to wholly encircle the insulating housing 10 for fixing the memory card 200, which decreases the total height of the memory card connector 100 of the present invention and occupies smaller space when the memory card connector 100 is assembled to an electronic product.

The foregoing description of the present invention has been presented for the purpose of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A memory card connector adapted for receiving a memory card, comprising:
    an insulating housing having a bottom wall, a rear wall, two opposite first and second sidewalls respectively extending upwardly from the bottom wall, all of which together define a receiving space therebetween for receiving the memory card;
    a plurality of terminals received in the insulating housing, each of the terminals having a contact portion projecting into the receiving space for being electrically connected with the memory card;
    two resisting portions respectively positioned at two opposite sides of the receiving space adjacent to the first and second sidewalls and spaced from the bottom wall for respectively pressing against two opposite sides of the memory card;
    a first shielding shell mounted to the first sidewall; and
    a second shielding shell mounted to the second sidewall to be spaced away from the first shielding shell.

2. The memory card connector as claimed in claim 1, wherein the first and second shielding shells respectively have first and second top plates respectively covering tops of the first and second sidewalls, the resisting portions extending from the corresponding top plates.

3. The memory card connector as claimed in claim 2, wherein an extending plate extends sideward from the first top plate, a sliding passage being formed between the bottom wall and the extending plate for allowing one of the two opposite sides of the memory card to slide therein, the corresponding resisting portion extending towards the bottom wall from a free edge of the extending plate.

4. The memory card connector as claimed in claim 2, wherein edges of either of the first and second top plates extend downwardly to form side plates attached to outside of the insulating housing, each side plate defining a fixing hole for being engaged with a substantially wedge-shaped lump defined on the outside of the insulating housing.

5. The memory card connector as claimed in claim 4, wherein the first top plate of the first shielding shell defines a through-slot, a portion of the first sidewall protrudes upwardly to form a projection for being engaged with the through-slot.

6. The memory card connector as claimed in claim 2, wherein the second sidewall defines a sliding groove communicating with the receiving space at rear thereof and separated from the receiving space by a partition at front thereof for receiving an ejector mechanism therein, the corresponding resisting portion extending inwardly from a front of the second top plate of the second shielding shell.

7. The memory card connector as claimed in claim 1, wherein tops of the first and second sidewalls respectively extend towards each other to form the resisting portions of a board shape.

8. The memory card connector as claimed in claim 7, wherein the resisting portion of the first sidewall defines a fixing slot, the first shielding shell has a top plate covered on the corresponding resisting portion, a side plate attached to an outside of the first sidewall, a grounding piece extending sideward from a bottom of the side plate and attached to the bottom wall, and a fixing plate extending downwardly from the top plate and buckled into the corresponding fixing slot.

9. The memory card connector as claimed in claim 7, wherein the second sidewall defines a sliding groove communicating with the receiving space at rear thereof and separated from the receiving space by a partition at front thereof for receiving an ejector mechanism therein, the corresponding resisting portion extending sideward from the partition.

* * * * *